(12) United States Patent
Ghanwani et al.

(10) Patent No.: US 6,842,788 B1
(45) Date of Patent: Jan. 11, 2005

(54) COMPUTING AND USING RESOURCE COLORS FOR COMPOSITE LINKS

(75) Inventors: Anoop Ghanwani, Menlo Park, CA (US); Donald Fedyk, Groton, MA (US)

(73) Assignee: Nortel Networks Limited, Quebec (CA)

( * ) Notice: Subject to any disclaimer, the term of this patent is extended or adjusted under 35 U.S.C. 154(b) by 829 days.

(21) Appl. No.: 09/686,186

(22) Filed: Oct. 11, 2000

(51) Int. Cl.$^7$ .......................................... G06F 15/173
(52) U.S. Cl. ...................... 709/238; 358/500; 370/229; 370/389; 379/114.08; 379/221.07; 701/201; 709/237
(58) Field of Search ............................... 709/238, 239, 709/240, 243, 246

(56) References Cited

U.S. PATENT DOCUMENTS

| | | | | |
|---|---|---|---|---|
| 4,756,019 A | * | 7/1988 | Szybicki | 379/114.08 |
| 5,467,345 A | * | 11/1995 | Cutler et al. | 370/229 |
| 5,539,815 A | * | 7/1996 | Samba | 379/221.07 |
| 5,659,490 A | * | 8/1997 | Imamura | 358/500 |
| 5,996,020 A | * | 11/1999 | Reed | 709/238 |
| 6,061,626 A | * | 5/2000 | Meredith | 701/201 |
| 6,501,754 B1 | * | 12/2002 | Ohba et al. | 370/389 |
| 6,529,958 B1 | * | 3/2003 | Oba et al. | 709/237 |
| 6,538,991 B1 | * | 3/2003 | Kodialam et al. | 370/229 |

OTHER PUBLICATIONS

Tanenbaum, Andrew S., "Computer Networks", 1981, Prentice–Hall, Inc., pp. 34–47.*

Don Fedyk and Anoop Ghanwani, "Metrics and Resource Classes for Traffic Engineering". Traffic Engineering Working Group, http://shika.aist–nara.ac.jp/member/nori–d/mlr/id/draft–fedyk–mpls–te–metrics–00.txt, Oct. 1999, accessed on Sep. 1, 2000, pp. 1–8.

Aviva Garrett and Margaret Jones, "JUNOS Internet Software Configuration Guide". Juniper Networks Technical Documentation, http://www.juniper.net/techpubs/, 1999–2000, accessed on Aug. 16, 2000, pp. 811–824.

Kireeti Kompella et al., Extensions to IS–IS/OSPF and RSVP in support of MPL (ambda) S. Juniper Network Working Group, http://search.ietf.org/internet–drafts/draft–kompella–mpls–optical–00.text, Feb. 2000, accessed on Jul. 25, 2000, pp. 1–14.

Kireeti Kompella, "A MIB for MPLS Traffic Engineered LSPs". Juniper Networks Working Group, http://shika.aist–nara–.ac.jp/member/nori–d/mlr/id/draft–kompella–mpls–te–mib–00.txt, Jul. 2000, accessed on Sep. 1, 2000, pp. 1–14.

* cited by examiner

Primary Examiner—Hosain Alam
(74) Attorney, Agent, or Firm—Nortel Networks Limited

(57) ABSTRACT

A router can consider two color vectors for a path including multiple links through a network. One color vector indicates colors that all of the multiple links include. Another color vector indicates the colors that none of the multiple links include. In setting up a constraint-based label switched path (LSP), a router can use a program that includes a logical process. With the process, the router can automatically compute the color vectors for the path whenever the path of an LSP changes and/or the characteristics (colors) of one or more of the multiple links constituting the LSP changes. Computing whether the path is eligible for inclusion in the LSP includes calculating whether the path includes all colors that must be included in an LSP and calculating whether the path includes any of the colors that must be excluded from the LSP.

40 Claims, 3 Drawing Sheets

COMPUTING AND USING RESOURCE COLORS FOR COMPOSITE LINKS

BACKGROUND

This invention relates to computing and using resource colors for composite links.

In a Multiprotocol Label Switching (MPLS) network, a signaling protocol is used to set up a label switched path (LSP) in the MPLS network. As part of setting up the LSP, routers included in the MPLS network set up a label information base (LIB) that maps an incoming label from an input port of the router to an output port and a new label value. The routers forward packets along links through the MPLS network based on these labels that are attached to the packet to indicate which LSP to use. The label is typically swapped to the new label at each router hop. In this way, an LSP identifies the specific path of nodes and links that the packet takes through the MPLS network. MPLS allows label stacking, where a packet can have more than one label. The forwarding of packets along links is based on the "top of stack" label. When the "top of stack" label is "popped" (or removed), forwarding is based on the next label in the stack that is now the new "top of stack" label. Label stacking is useful for building hierarchical LSPs where several smaller, shorter-lived LSPs can be "stacked" onto a larger, longer-lived LSP. Using hierarchical LSPs can provide better scalability as the network grows in size.

Two kinds of LSPs can be set up in a network running MPLS: control driven LSPs and traffic engineered LSPs. A traffic engineered LSP through the network is established using a label distribution protocol (LDP) such as RSVP-TE (resource reservation setup protocol with traffic engineering) or CR-LDP (constraint-based LDP). The LDP also reserves network resources necessary to meet pre-defined service requirements of the LSP. Traffic engineered LSPs typically have constraints associated with them such as bandwidth requirements and maximum tolerable delay.

As a part of traffic engineering, links in the network may also be assigned a 32-bit vector called the resource class or color of the link. The color vector can be thought of as a collection of link attributes. Each color in the color vector is represented by a bit. If a bit in the color vector is asserted (is a one, as opposed to a zero) for a link, then the link possesses the attribute corresponding to that color.

Colors are useful for specifying attributes such as satellite link, terrestrial link, low security link, high security link, etc. Then, during path selection for a particular LSP, additional constraints can be specified such as: find a path for an LSP that uses only links that are not satellite links and that also have a high security. For example, a network may include the four colors red, green, blue, and black, using only four of the thirty-two available bits in the color vector. A link can be a member of zero, one, or more of these colors. The operator can specify that the LSP to be set up must include green links but not black links. Using a four-bit color vector having bits from left to right representing red, green, blue, and black, any link having a color mask of X1X0 (where X means "do not care" and may be a one or a zero) would satisfy the constraints specified by the operator, and would thus be eligible for inclusion in the path selection process for the LSP.

When computing the path for the LSP, an interior gateway protocol's (IGP) path selection process will first prune the link state database of all links that are deemed ineligible either due to insufficient bandwidth or due to possession or lack of a certain set of colors. The path selection process would then run some form of a shortest path algorithm to compute the "best" path that satisfies all of the specified constraints. After the path selection process provides the path, the LDP is used to setup the LSP at the routers along the path through the network.

Once the LSP has been computed as described above, it may be used as a "composite link" by the IGP when performing path selection to compute paths for subsequent LSPs. In other words, the LSP that was setup can be treated as though it were a physical link in the network. New LSPs are basically "stacked" onto the LSP corresponding to the composite link. Just as is done for regular physical links, the IGP routing protocols such as OSPF (open shortest path first) and IS—IS (intermediate system to intermediate system) can also advertise information about the composite link such as its bandwidth and color vector. The composite link's color vector should represent the attributes of all of its links, each of those links having its own color vector.

SUMMARY

According to an aspect of the present invention, computing and using resource color for composite links includes computing for a path that includes multiple links a first color vector that indicates colors that all of the multiple links include and computing for the path a second color vector that indicates colors that none of the multiple links include.

According to another aspect of the present invention, computing and using resource color for composite links includes calculating whether a path including multiple links includes all colors that must be included in a label switched path (LSP) and calculating whether the path includes any colors that must be excluded from the LSP.

According to another aspect of the present invention, an apparatus includes a mechanism configured to route data between devices configured to connect to a network and a process accessible by the mechanism that is configured to automatically compute two color vectors for a path running across the network and including multiple links.

One or more of the following advantages may be provided by one or more aspects of the invention.

When an LSP is set up using multiple links, the LSP can be used in subsequent calculations as a composite link. When using composite links, it is generally not possible to consider the individual color vectors corresponding to each of the links included in the composite link (collectively called constituent links) to determine if the composite link can be included in a new LSP. This is because all routers in the network that might want to use the composite link as a part of a new LSP will not know the exact path taken by the composite link. The routers only have knowledge of the end-points of the composite link and the characteristics of the composite link specified in a manner as if it were a physical link between the routers at its end-points. Typically, only the source router that was responsible for setting up the composite link will have knowledge of the path taken by the composite link. Therefore, once a composite link has been set up, the link color should be computed for the composite link so that the information can be advertised by the IGP along with the other information (such as bandwidth) about the composite link.

The color of the composite link cannot be represented by calculating a single color vector for the composite link. This is true because performing almost any bitwise operation on the set of color vectors of the constituent links will result in some loss of information. For instance, performing a bitwise AND operation on the color vectors of all constituent links may result in losing information about colors present in one or more of the constituent links because those colors happened to be absent from at least one of the other constituent links. Similarly, performing a bitwise OR operation on the color vectors of all the constituent links may result in erroneous information because one or more of the constituent links may not include a color while at least one of the other constituent links may have that color; in that case, the composite link will erroneously be treated as link that has the union of the colors of all of its constituent links. Manually configuring the link color will also fail because some information about the colors of the constituent links will be lost as it is not possible to represent the properties of all of the constituent links with a single vector. Furthermore, the individual links included in a composite link can change if the LSP corresponding to the composite link gets re-routed.

All of the information about the color vectors of all the constituent links is not needed. What is needed is a summary of information about the link colors of the constituent links that can indicate whether the composite link can be used in the path selection process for a subsequent LSP. The color of the composite link itself can be considered through use of two color vectors identifying the composite link. One of the composite link's color vectors indicates the colors that all of the links included in the composite link do not include. The other color vector indicates the colors that all of the links do include. When two color vectors are used, it is possible to compute the color of the composite link automatically. With two vectors used to represent the color of a composite link, it is also possible to set the color manually. For instance, manual intervention would be required if the path used by the LSP corresponding to the composite link changes due to network dynamics, such as link or router failures.

By automatically computing the color vector for a composite link, color vectors can be computed any time an LSP is set up and/or any time an LSP corresponding to the composite link changes its path and/or a link's characteristics (colors) are re-configured. Also, by using an inclusion color indicating the colors that all of the constituent links include and an exclusion color indicating all of the colors that at least one of the constituent links includes, the composite link's eligibility for inclusion in the IGP's constraint-based shortest path computation can be determined.

Other advantages and features will become apparent from the following description and from the claims.

DETAILED DESCRIPTION

Figure 1:
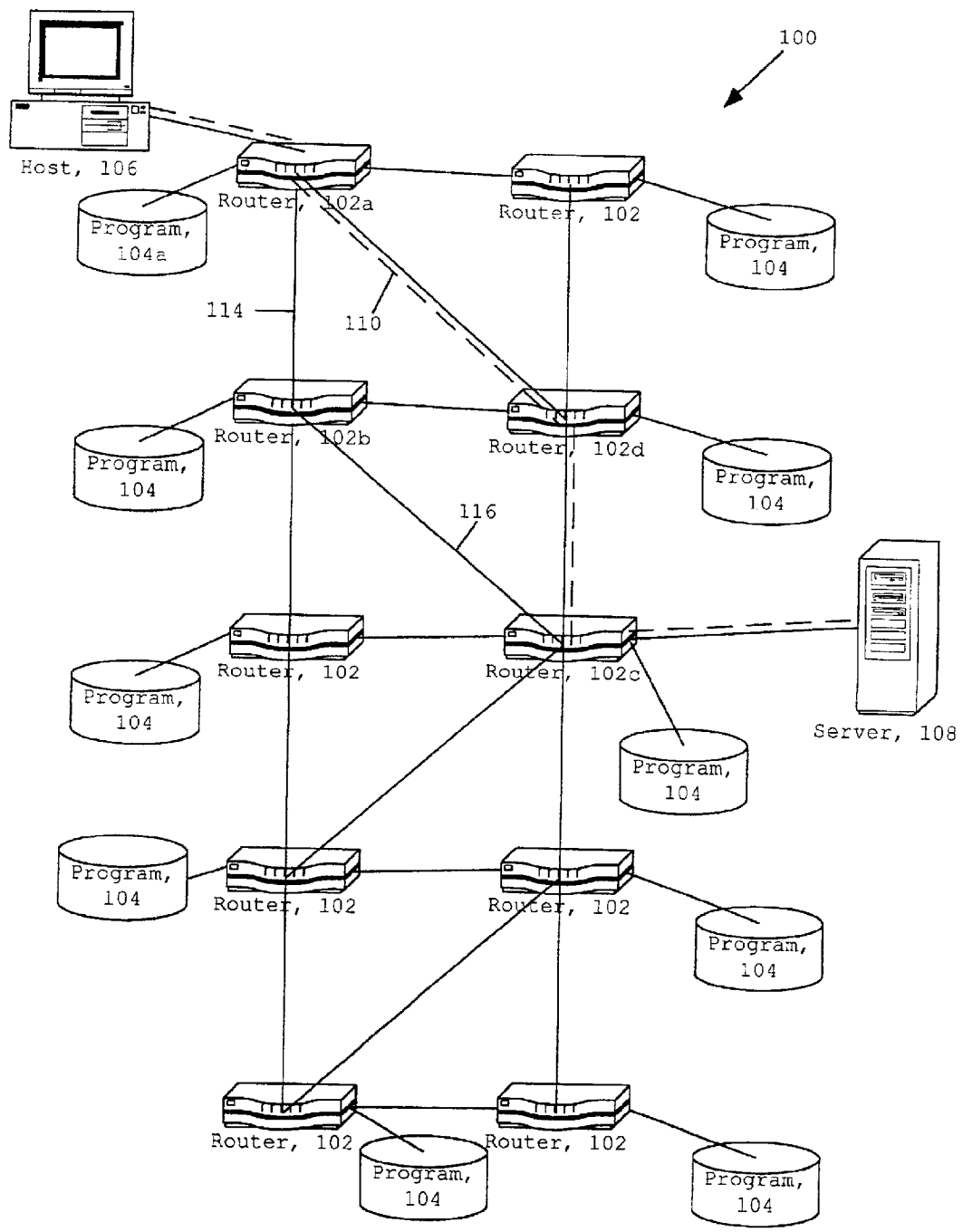
FIG. 1 is a block diagram of a network configuration in accordance with an embodiment of the invention.

Referring to FIG. 1, LSPs can be set up in a network configuration 100. The network configuration 100 can include one or more networks, e.g., the Internet and a local network. Typically, a device capable of routing data through a network such as a router 102 included in the network configuration 100 sets up an LSP. Path selection for the LSP is typically based on different metrics. Metrics are weights assigned to links in the network configuration 100 that indicate the relative preference of using one link over another during path selection. Examples of metrics include hop count, available bandwidth, propagation and transmission delay, administrative costs, and economic costs. In setting up an LSP based on one or more metrics, a router 102 usually uses a signaling protocol, e.g., RSVP or CR-LDP, and the path determined by the IGP's path selection process that operates on network topology information contained in a link state database maintained by the router 102. The router's responsibilities can include computing the path and reserving resources along the path included in the network configuration 100.

After the LSP has been set up by a signaling protocol, the LSP can be used in subsequent path calculations as a composite link. Individually considering a color vector for each of the individual links included in the composite link to determine if the composite link can be included in a new LSP may not be possible. The color of the composite link itself can be considered through use of two color vectors identifying the composite link. One of the composite link's color vectors, an exclusion color vector, indicates the colors that any of the constituent links included in the composite link include. The other color vector, an inclusion color vector, indicates the colors that all of the links do include.

In setting up a constraint-based LSP, the router 102 also uses a program 104 that includes a logical process described below (see FIGS. 2 and 3). The router 102 can automatically compute a color vector for a composite link using the router's associated program 104 whenever the path of an LSP is first setup and/or changes. The path can change, for example, if one of the links included in the original path corresponding to the composite link becomes unavailable. The LDP and the IGP routing protocol used by the router 102 should be modified to apply the logical process in their calculations.

The changes to the signaling protocol include carrying the inclusion and exclusion color vectors for the composite link dynamically during setup and reconfiguration. The bitwise AND and OR operations described below can be performed incrementally as the signaling messages propagate from one router to another during LSP setup.

The IGP routing protocol's modifications include enabling the protocols to carry both color vectors when advertising a composite link and to dynamically recognize changes in a composite link's color vector as calculated by the logical process. Further, the IGP routing protocol should allow the A router 102 to send the newly computed color vector and other routing information regarding the composite link to other nodes in the network configuration 100 whenever a color vector is computed.

The program 104 may be located in the router 102 or be otherwise accessible by the router 102. In setting up the constraint-based LSP, the router 102 uses the program 104 to determine which paths included in the network configuration 100 are eligible for inclusion in the path selection process for the LSP based on the constraints specified and the characteristics of the link, including its color. Examples of characteristics that can be represented by the color vector include link type (satellite or terrestrial), security level, and reliability (loss rate and availability). Other characteristics such as the hop count are typically specified as metrics. Constraints of the path selection process are specified using metrics and one or more of the characteristics.

For example, a host 106 may need to transmit data packets (not shown) destined for a server 108 to a first router 102a. Typically, an LSP for routing these data packets is created from the first router 102a to a destination router 102c. This is done either by configuration at the first router 102a or by online or offline traffic engineering tools that interact with the first router 102a. Once the LSP has been set up, the data packets can be forwarded on the LSP. As part of the LSP setup process, the first router 102a needs to find a path for the LSP. To do this, the first router 102a accesses the program 104a and determines which links meet all constraints (if any). Once a set of acceptable links has been identified, the first router 102a can determine the "best" path by running a path selection algorithm on the pruned link state database. The first router 102a can then create an LSP using an LDP. As part of the setup, labels are assigned for use by the LSP by all routers along the path (routers 102a, 102d, 102c). Data packets can then be forwarded on the LSP by prepending them with the label at the first router 102a. In this way, the first router 102a may create an LSP along a path 110 for a given set of constraints. Note that the links included in the path 110 can be composite links. Given different constraints, the first router 102a may create an LSP for the packet along a different path, as determined by the constraint-based path selection process. The constraint-based path selection process includes pruning the link state database of all ineligible links.

Instead of the first router 102a computing the path for the entire LSP, the first router 102a may initiate the setup of the LSP to the destination router 102c by sending a signaling packet to a neighboring router in the direction of the final router 102c. The LSP can be created in an incremental fashion by each router 102 encountered along the path as the signaling message propagates to the destination router 102c. In that case, the first router 102a still uses the program 104a and chooses a link for the LSP, such as link 114, and forwards the signaling message on the link 114 to a second router 102b. The second router 102b determines the next link, here link 116, and forwards the signaling message to the destination router 102c that terminates the LSP. The third router 102c would be responsible for receiving labeled traffic from the LSP, removing the label and then forwarding the packet to its destination, the server 108.

Figure 2:
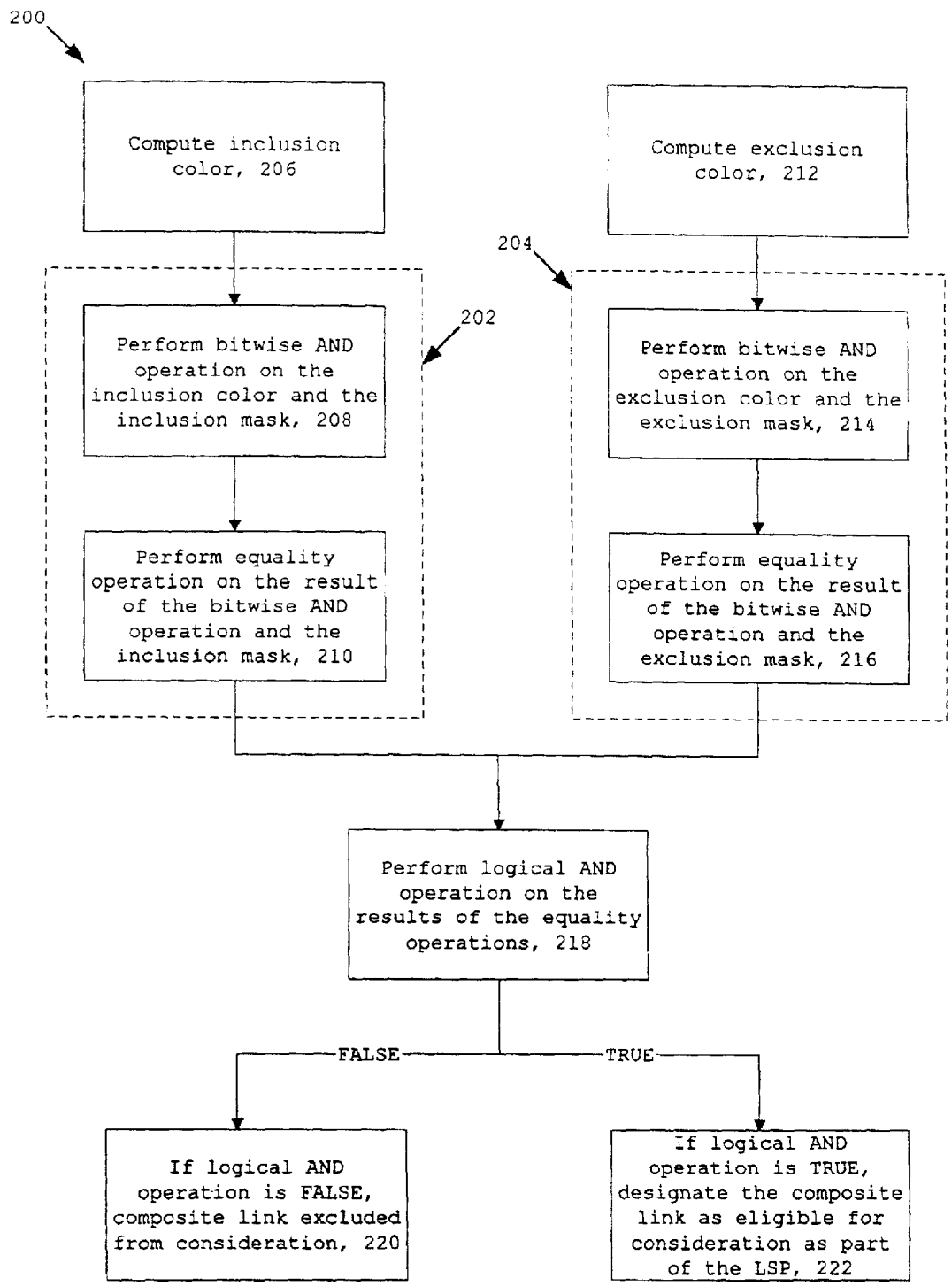
FIGS. 2–3 are flowcharts showing a process of automatically computing a color vector for a composite link in accordance with embodiments of the invention.

Referring to FIG. 2, the color vector for a composite link can be automatically computed from its constituent links using a process 200. The process 200 further assesses whether the composite link meets the required eligibility criteria for an LSP by performing an inclusion test 202 and an exclusion test 204. The process 200 considers the composite link's constituent links to compute the inclusion and exclusion color vectors that together are used to represent the color of the composite link. The inclusion test 202 evaluates whether all of the constituent links include all colors that must be included in an LSP. The exclusion test 204 evaluates whether any of the constituent links include any colors that must be excluded from an LSP. If the constituent component links fail either the inclusion test 202 (by not including all necessary colors) or the exclusion test 204 (by including any excluded colors), the composite link is not eligible for inclusion in a path computation process for setting up the LSP.

The process 200 includes performing this logical expression:

(inclusion color & inclusion mask==inclusion mask)
&&
(exclusion color & exclusion mask==0), where "&" implies a bitwise AND operation, "&&" implies a logical AND operation, and "==" implies a test for equality operation. If both sides of the logical AND operation are TRUE, indicating passage of both the inclusion and exclusion tests 202, 204, a composite link is eligible for consideration in an LSP. The process 200 can be implemented as software, hardware, or a combination of the two.

The inclusion test 202 uses a variable called the inclusion color. The inclusion color is one of the two color vectors used to represent the color of the composite link. The inclusion color is constructed at the time of setting up the LSP corresponding to the composite link by performing 206 a bitwise AND operation on the color vectors of all of the constituent links. In an example with five constituent links A–E and six bits (colors), the inclusion color is calculated as:

| | |
|---|---|
| 1 1 0 0 0 1 | Constituent Link A |
| 1 0 1 0 0 0 | Constituent Link B |
| 1 1 1 1 0 1 | Constituent Link C |
| 1 1 0 1 0 1 | Constituent Link D |
| 1 0 0 0 0 1 | Constituent Link E |
| 1 0 0 0 0 0 | Inclusion Color |

For the constituent links, a "one" indicates that the constituent link is a member of that color and a "zero" indicates non-membership in that color. However, as with all calculations in the process 200, the meanings of "one" and "zero" can be reversed, as long as their meanings stay consistent throughout the process 200. (If the meanings of "zero" and "one" are reversed, the logical ANDing and ORing will not hold anymore. Instead, a bitwise NOT would be performed on each of the colors, followed by a bitwise AND operation on all of the colors, and then a bitwise NOT operation on the result.) Thus, the inclusion color is a bit string as long as the constituent links' color vectors, a number equal to the number of colors considered for the network. In practice, the length of the color vectors is a fixed 32-bit number. The number of colors being used in the network will determine the subset of those bits that are significant from the point of view of interpreting the link's color. A "one" in the inclusion color indicates that all constituent links include that color, and a "zero" indicates that at least one constituent link does not include that color.

The inclusion mask used in the inclusion test 202 indicates the colors that every link must posses in order to be considered eligible for inclusion in the LSP, and therefore the colors that every constituent link must be a member of for the composite link to be eligible for inclusion in the LSP. For example, a network may include these colors (from left to right): blue, green, red, yellow, brown, and black. (The network can include any number of colors, limited by the number of bits available in the color vector.) If an LSP must include links colored blue, the inclusion mask is 100000, where a "one" indicates a required color. Performing 208 a bitwise AND operation on the inclusion mask and the inclusion color produces an inclusion result for the composite link, as shown:

| | |
|---|---|
| 1 0 0 0 0 0 | Inclusion Color |
| 1 0 0 0 0 0 | Inclusion Mask |
| 1 0 0 0 0 0 | Inclusion Result |

A test for equality operation is performed 210 on the inclusion result and the inclusion mask to produce a final inclusion result of the inclusion test 202. Because the inclusion result and the inclusion mask are identical in this example, the test for equality operation evaluates to TRUE.

Before performing the exclusion test 204, an exclusion color needs to be available for the composite link. The exclusion color is the second of the two color vectors used to represent the color of the composite link. The exclusion color is constructed at the time that the LSP corresponding to the composite link was setup by performing 212 a bitwise OR operation on the color vectors of all the constituent links. For example:

| | |
|---|---|
| 1 1 0 0 0 1 | Constituent Link A |
| 1 0 1 0 0 0 | Constituent Link B |
| 1 1 1 1 0 1 | Constituent Link C |
| 1 1 0 1 0 1 | Constituent Link D |
| 1 0 0 0 0 1 | Constituent Link E |
| 1 1 1 1 0 1 | Exclusion Color |

Thus, the exclusion color is, like the inclusion color, a bit string as long as the constituent links' color vectors. In the exclusion color, however, a "one" indicates that at least one constituent link is a member of that color while a "zero" indicates that none of the constituent links are members of that color.

The exclusion mask used in the exclusion test 204 indicates the colors that must not be included in the LSP and therefore the colors that every constituent link must not be a member of for the composite link to be eligible for inclusion in the LSP. So using the colors in the example above, the color exclusion constraint for an LSP that must not include links colored yellow or brown would be expressed using an exclusion mask of 000110. Performing 214 a bitwise AND operation on the exclusion mask and the exclusion color produces an exclusion result, as shown:

| | |
|---|---|
| 1 1 1 1 0 1 | Exclusion Color |
| 0 0 0 1 1 0 | Exclusion Mask |
| 0 0 0 1 0 0 | Exclusion Result |

A test for equality operation is performed 216 on the exclusion result and a bit string of zeroes (or a single zero as shown in the above logical equation) to produce a final exclusion result of the exclusion test 204. Because the exclusion result in this example includes a "one," the test for equality operation evaluates to FALSE.

A logical AND operation is performed 218 on the final inclusion result and the final exclusion result. The result of the logical AND operation indicates the composite link's compliance with the inclusion and exclusion requirements of the LSP. Using the results above, the final result is FALSE because the final inclusion result (TRUE) and the final exclusion result (FALSE) are not both TRUE. A FALSE result indicates that the composite link failed either or both of the inclusion and exclusion tests 202, 204 and loses 220 eligibility for inclusion in the LSP. If constituent links C and D were not members of the color yellow, the final exclusion result would be TRUE, as would the final result. If the final result is TRUE, then the composite link is designated 222 as eligible for the LSP.

The inclusion color and the exclusion color are actually computed at the time when the LSP corresponding to the composite link is setup. These color vectors must also be advertised by the IGPs along with other information about the composite link in order to be useful. The rest of FIG. 2 (computing the inclusion color 206 and computing the exclusion color 212) is actually performed at the time when a request of a subsequent LSP is made to determine the eligibility of the composite link for inclusion in the path selection process for the new LSP based on its constraints.

Variations can be made on the process 200 to provide the same results. For example, the process 200 can perform the inclusion test 202 or the exclusion test 204 first and/or can to perform the tests 202, 204 concurrently. If the tests 202, 204 are not performed concurrently, the process 200 can be modified as shown in FIG. 3.

Figure 3:
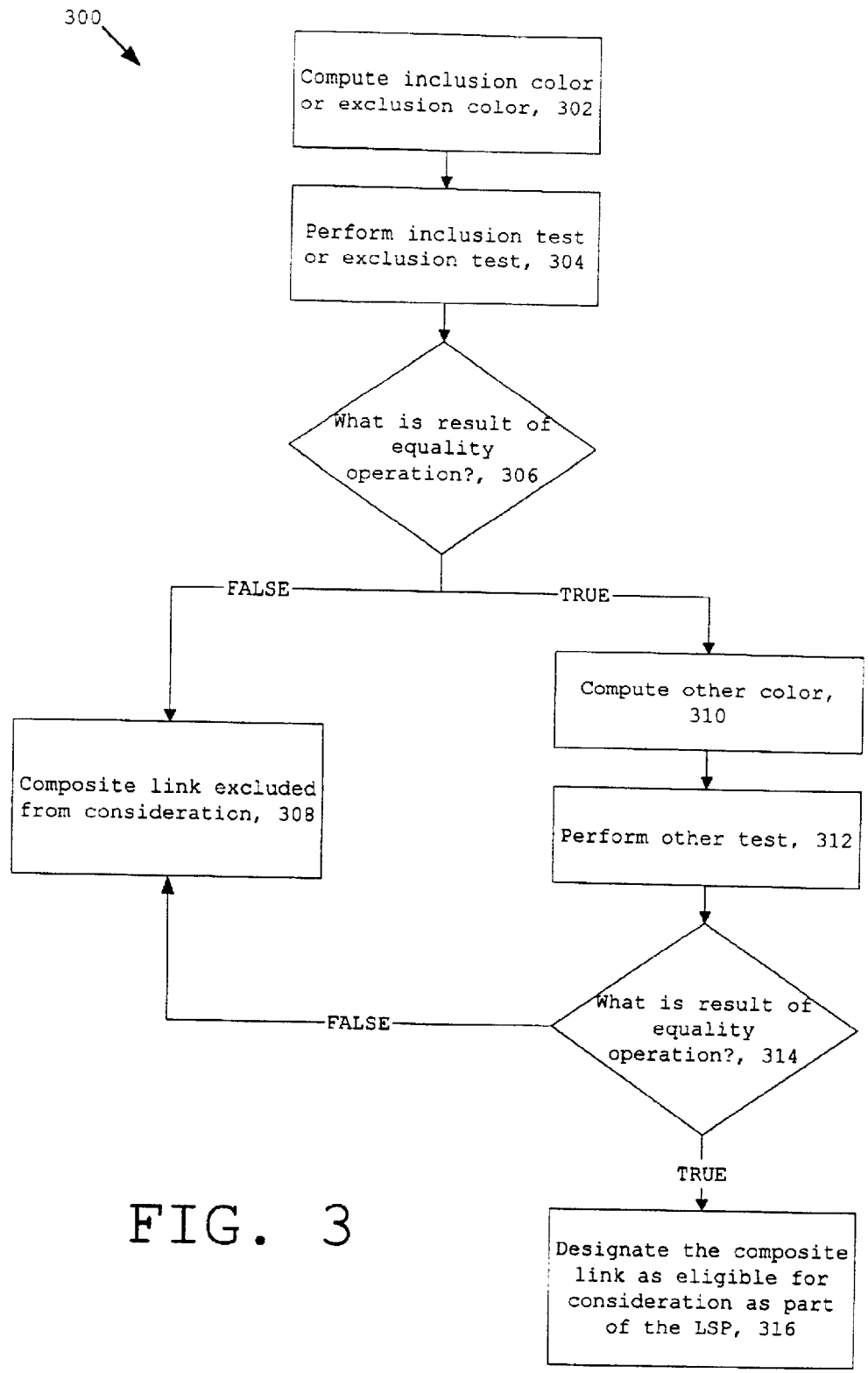

In FIG. 3, a modified process 300 performs 304 either the inclusion test 202 or the exclusion test 204 (after computing 302 the appropriate inclusion or exclusion color). As described above, the inclusion color and the exclusion color are actually computed at the time when the LSP corresponding to the composite link is setup. The modified process 300 then determines 306 the result of the performed test's equality operation 210, 216. If the result of the test for equality operation 210, 216 is FALSE, then the other test 202, 204 is not performed because the logical AND operation that would be performed on the two test for equality operation results would be FALSE. Consequently, the composite link is excluded 308 from consideration in the set up of the LSP. If the test for equality operation in the performed test 202, 204 is TRUE, then the other test is performed 312 (after computing 310 the appropriate inclusion or exclusion color). If the result of that test 202, 204 is FALSE, then the logical AND operation that would be performed on the two test for equality operation results would be FALSE, so the composite link is excluded 308 from consideration in the set up of the LSP. If the result of that test 202, 204 is TRUE, then the logical AND operation that would be performed on the two test for equality operation results would be TRUE, so the composite link is designated 316 as eligible for consideration as part of the LSP.

A number of embodiments of the invention have been described. Nevertheless, it will be understood that various modifications may be made without departing from the spirit and scope of the invention. Accordingly, other aspects, advantages, and modifications are within the scope of the following claims.

What is claimed is:

1. A method for use on a network, comprising:
   determining a first color vector for a path comprised of multiple links between nodes of the network, the first color vector being determined based on color vectors for the multiple links, each of the color vectors representing multiple colors that correspond to attributes of the network, the first color vector indicating colors that all of the multiple links include;
   determining a second color vector for the path based on the color vectors for the multiple links, the second color vector indicating colors that none of the multiple links include; and
   using the first color vector and the second color vector in determining a route through the network.

2. The method of claim 1, wherein using comprises considering the path for inclusion in a label switched path (LSP) if the path includes all colors that must be included in the LSP and does not include any colors that must be excluded from the LSP.

3. The method of claim 1, further comprising:
   determining whether the path includes all colors that must be included in a label switched path (LSP) by performing an AND operation on the first color vector and a mask indicating colors that must be included in the LSP; and determining if a result of the AND operation equals the mask.

4. The method of claim 1, further comprising:
determining whether the path includes any colors that must be excluded from a label switched path (LSP) by performing an AND operation on the second color vector and a mask indicating colors that must be excluded from the LSP; and
determining if a result of the AND operation equals zero.

5. The method of claim 1, further comprising:
automatically re-determining the first color vector and the second color vector if an attribute of any of the multiple links changes.

6. The method of claim 1, further comprising:
automatically re-determining the first color vector and the second color vector if one or more of the multiple links included in the path changes.

7. The method of claim 1, wherein the colors indicate service attributes of the multiple links.

8. The method of claim 1, wherein the network comprises the Internet.

9. A method for use on a network, comprising:
determining whether a path through the network includes all colors that must be included in a label switched path (LSP), wherein the colors correspond to attributes of the network associated with the LSP, the path comprises multiple links having color vectors, a color vector for a link represents multiple colors that correspond to attributes of the network associated with the link, and determining is performed based on the color vectors for the multiple links;
determining, based on the color vectors for the multiple links, whether the path includes any colors that must be excluded from the LSP; and
deciding whether to include the path in the LSP based on colors associated with the path.

10. The method of claim 9, wherein deciding comprises considering the path for inclusion in the LSP if the path includes all colors that must be included in the LSP and does not include any colors that must be excluded from the LSP.

11. The method of claim 9, wherein determining and determining are performed automatically.

12. The method of claim 9, wherein determining whether the path includes all colors that must be included in the LSP comprises:
performing an AND operation on a color vector of the path and a mask indicating colors that must be included in the LSP; and
determining if a result of the AND operation equals the mask.

13. The method of claim 9, wherein determining whether the path includes any colors that must be excluded from the LSP comprises:
performing an AND operation on a color vector of the path and a mask indicating colors that must be excluded from the LSP; and
determining if a result of the AND operation equals zero.

14. The method of claim 9, wherein deciding comprises automatically determining if the path is eligible for inclusion in the LSP based on whether the path includes all colors that must be included in the LSP and whether the path includes any colors that must be excluded from the LSP.

15. The method of claim 9, further comprising concurrently determining whether the path includes all colors that must be included in the LSP and determining whether the path includes any colors that must be excluded from the LSP.

16. The method of claim 9, wherein it is first determined whether the path includes all colors that must be included in the LSP and, if the path does not include all colors that must be included in the LSP, it is not determined if the path includes any colors that must be excluded from the LSP; or
wherein it is first determined whether the path includes any colors that must be excluded from the LSP and, if the path includes any colors that must be excluded from the LSP, it is not determined if the path includes all colors that must be included in the LSP.

17. The method of claim 9, further comprising setting-up the LSP.

18. The method of claim 9, wherein the path includes stacked LSPs.

19. The method of claim 9, wherein the colors indicate service attributes of the multiple links.

20. The method of claim 9, wherein determining and determining are performed when one or more of the multiple links changes.

21. An article comprising a machine-readable medium which stores machine-executable instructions, the instructions causing a machine to:
determine whether a path through a network includes all colors that must be included in a label switched path (LSP), wherein the colors correspond to attributes of the network associated with the LSP, the path comprises multiple links having color vectors, a color vector for a link represents multiple colors that correspond to attributes of the network associated with the link, and determining is performed based on the color vectors for the multiple links;
determine, based on the color vectors for the multiple links, whether the path includes any colors that must be excluded from the LSP; and
decide whether to include the path in the LSP based on colors associated with the path.

22. The article of claim 21, wherein deciding comprises considering the path for inclusion in the LSP if the path includes all colors that must be included in the LSP and does not include any colors that must be excluded from the LSP.

23. The article of claim 21, wherein determining and determining are performed automatically.

24. The article of claim 21, wherein determining whether the path includes all colors that must be included in the LSP comprises:
performing an AND operation on a color vector of the path and a mask indicating colors that must be included in the LSP; and
determining if a result of the AND operation equals the mask.

25. The article of claim 21, wherein determining whether the path includes any colors that must be excluded from the LSP comprises:
performing an AND operation on a color vector of the path and a mask indicating colors that must be excluded from the LSP; and
determining if a result of the AND operation equals zero.

26. The article of claim 21, wherein deciding comprises automatically determining if the path is eligible for inclusion in the LSP based on whether the path includes all colors that must be included in the LSP and whether the path includes any colors that must be excluded from the LSP.

27. The article of claim 21, wherein determining and determining are performed concurrently.

28. The article of claim 21, wherein it is first determined whether the path includes all colors that must be included in the LSP and, if the path does not include all colors that must be included in the LSP, it is not determined if the path includes any colors that must be excluded from the LSP; or wherein it is first determined whether the path includes any colors that must be excluded from the LSP and, if the path includes any colors that must be excluded from the LSP, it is not determined if the path includes all colors that must be included in the LSP.

29. The article of claim 21, further comprising instructions that cause the machine to set up the LSP.

30. The article of claim 21, wherein the path includes stacked LSPs.

31. The article of claim 21, wherein the colors indicate service attributes of the multiple links.

32. The article of claim 21, wherein determining and determining are performed when one or more of the multiple links changes.

33. An apparatus comprising:

a memory that stores executable instructions for use in routing data along a path of a network between devices connected to the network; and a processor that executes the instructions to:

determine whether a path through the network includes all colors that must be included in a label switched path (LSP), wherein the colors correspond to attributes of a network associated with the LSP, the path comprises multiple links having color vectors, a color vector for a link represents multiple colors that correspond to attributes of the network associated with the link, and determining is performed based on the color vectors for the multiple links;

determine, based on the color vectors for the multiple links, whether the path includes any colors that must be excluded from the LSP; and decide whether to include the path in the LSP based on colors associated with the path.

34. The apparatus of claim 33, wherein determining and determining are performed if one or more of the multiple links changes.

35. The apparatus of claim 33, wherein deciding comprises considering the path for inclusion in a label switched path (LSP) across the network if the path includes all colors that must be included in the LSP and does not include any colors that must be excluded from the LSP.

36. The apparatus of claim 33, wherein determining whether the path includes all colors that must be included in a label switched path (LSP) comprises:

performing an AND operation on a color vector of the path and a mask indicating colors that must be included in the LSP; and determining if a result of the AND operation equals the mask.

37. The apparatus of claim 33, wherein determining whether the path includes any colors that must be excluded from a label switched path (LSP) comprises:

performing an AND operation on a color vector of the path and a mask indicating colors that must be excluded from the LSP; and determining if a result of the AND operation equals zero.

38. The apparatus of claim 33, wherein the processor executes instructions to notify other devices on the network of the first and second color vectors.

39. The apparatus of claim 33, wherein the processor executes instructions to to set up a label switched path across the network.

40. The apparatus of claim 33, wherein the instructions comprise software to automatically determine the color vectors.

* * * * *